(12) United States Patent
Niewohner

(10) Patent No.: US 6,390,750 B1
(45) Date of Patent: May 21, 2002

(54) METHOD AND MEANS FOR BATCHING OUT THE INGREDIENTS OF A FEED RATION

(76) Inventor: Steven L. Niewohner, Rte. 2, Box 18, Elgin, NE (US) 68636

(*) Notice: Subject to any disclaimer, the term of this patent is extended or adjusted under 35 U.S.C. 154(b) by 0 days.

(21) Appl. No.: 09/649,568

(22) Filed: Aug. 28, 2000

(51) Int. Cl.$^7$ .................. B65G 65/23; B65G 67/04; B65G 69/00
(52) U.S. Cl. .................. 414/21; 414/399; 414/420; 414/422; 414/809; 119/51.01
(58) Field of Search .................. 414/21, 399, 420, 414/422, 809; 119/51.01; 366/141; 298/11

(56) References Cited

U.S. PATENT DOCUMENTS 5,064,248 A * 11/1991 Tegtmeier .................. 298/11
5,299,856 A    4/1994 Grosz .................. 298/11
RE34,776 E * 11/1994 Pratt .................. 366/141

FOREIGN PATENT DOCUMENTS

FR    2591206    * 6/1987 .................. 414/21

* cited by examiner

*Primary Examiner*—Steven A. Bratlie
(74) *Attorney, Agent, or Firm*—Thomte, Mazour & Niebergall; Dennis L. Thomte

(57) ABSTRACT

A side dump box for dumping the ingredients of a feed ration into a feed mixing truck is provided. A side dump box is pivotally moved on a pair of upwardly and outwardly extending slides to enable the side dump box to be elevated from a lower position to an elevated position and then pivotally moved so that contents of the side dump box may be dumped into the interior of a feed mixing truck. The side dump box includes a plurality of load cells which indicate the amount of ingredients, by weight, placed in the interior of the side dump box.

8 Claims, 6 Drawing Sheets

US 6,390,750 B1

METHOD AND MEANS FOR BATCHING OUT THE INGREDIENTS OF A FEED RATION

BACKGROUND OF THE INVENTION

1. Field of the Invention

This invention relates to a means for batching out the ingredients of a feed ration as well as the method of accomplishing the same.

2. Description of the Related Art

In many feedlot operations wherein large numbers of cattle are fed a feed ration consisting of two or more ingredients, it is necessary to combine those ingredients in the proper ratio, mix the ingredients, and place the ration in a feed bunk or the like for consumption by the cattle. One prior art method of accomplishing the above is to: (1) drive a feed mixing truck into the pit area wherein the ingredients such as alfalfa, silage, corn, etc., are stored in bulk; (2) using a front-end loader to dump an ingredient into the feed mixing truck until the proper amount of that ingredient is received within the box of the feed mixing truck as indicated by the load cells mounted on the feed mixing truck; and (3) repeating step (2) for each of the ingredients of the desired feed ration. When the feed mixing truck is filled with the unmixed ingredients, the feed mixing apparatus on the feed mixing truck is activated to mix the ingredients as the truck as driven to the feedlot area. The truck then normally augers the mixed feed ration into the feed bunks or the like.

The need for the feed mixing truck to sit and wait until the front-end loader has filled the truck with the proper amounts of two or more ingredients is troublesome, since it takes approximately eight to ten minutes to accomplish the same.

SUMMARY OF THE INVENTION

An apparatus for batching out the ingredients of a feed ration and dumping the same into a feed mixing truck positioned adjacent thereto is disposed. The apparatus includes a first substantially horizontally disposed support frame having a second support frame positioned thereabove. A load cell means is positioned between the first and second support frames for sensing the weight imposed o the second support frame. A pair of upstanding slide supports are secured to the second support frame and extend upwardly and outwardly therefrom. A slide is mounted on each of the slide supports with the slides being movable between a normal lower position and an elevated position. A side dump box is pivotally mounted on the upper ends of the slides and is selectively movable between a non-dumping position and a dumping position. A liquid holding tank is provided on the side dump box for holding liquid supplements which are weighed in and then dumped out with the rest of the ingredients when the feed truck is to be loaded. The weigh cells are operatively connected to an indicator or readout which indicates the amount of weight imposed on the load cells. The operation of the apparatus is remotely controllable so that the driver of the feed mixing truck does not have to leave the truck cab to operate the same nor does the tractor operator have to dismount from the tractor to operate the apparatus.

In operation, the slides are lowered to their lower position so that the side dump box is positioned fairly near to the ground. A front-end tractor loader or the like then is used to dump a particular ingredient into the side dump box until the weigh cell indicating means indicates that the proper amount of that particular ration has been deposited in the side dump box. The front-end loader then dumps a second ingredient into the side dump box until the weigh cell indicating means indicates that the proper amount of the second ingredient has been placed in the side dump box. The procedure is repeated until the side dump box has been filled with all of the ingredients of the feed in the proper amounts by weight. If a liquid supplement is to be added to the ration, the liquid supplement is pumped into the holding tank on the side dump box until the proper amount of liquid supplement has been received therein.

When a feed mixing truck arrives in the pit area, the feed mixing truck is driven adjacent the apparatus. The side dump box is then elevated, if it has not already been elevated, to its upper position. The side dump box is then moved to its dumping position so that the ingredients in the side dump box are dumped into the feed mixing truck. If a liquid supplement is being added to the ration, the liquid supplement is also dumped into the feed mixing truck at the time that the bulk ingredients are dumped into the feed mixing truck. The side dump box is then moved to its non-dumping position and lowered so that another feed ration may be placed therein. The feed mixing truck then travels to the feedlot area with the feed mixing apparatus on the feed mixing truck being activated so that the ingredients of the feed ration are mixed as the truck travels from the pit area to the feedlot area. The fact that the feed mixing truck does not have to wait while individual ingredients are successively loaded into the truck box, but has all of the ingredients dumped simultaneously into the truck box, dramatically decreases the time normally required to load the feed mixing truck.

It is therefore a principal object of the invention to provide a method and means for batching out the ingredients of a feed ration.

A further object of the invention is to provide an apparatus for batching out the ingredients of a ration.

A further object of the invention is to provide an apparatus of the type described above which is used as a temporary holding system for the ingredients until a feed mixing truck arrives at the pit.

A further object of the invention is to provide an apparatus of the type described it above wherein the operation thereof may be remotely controlled so that the truck driver or the like does not have to leave the truck cab to operate the equipment.

These and other objects will be apparent to those skilled in the art.

DESCRIPTION OF THE PREFERRED EMBODIMENT

Figure 1:
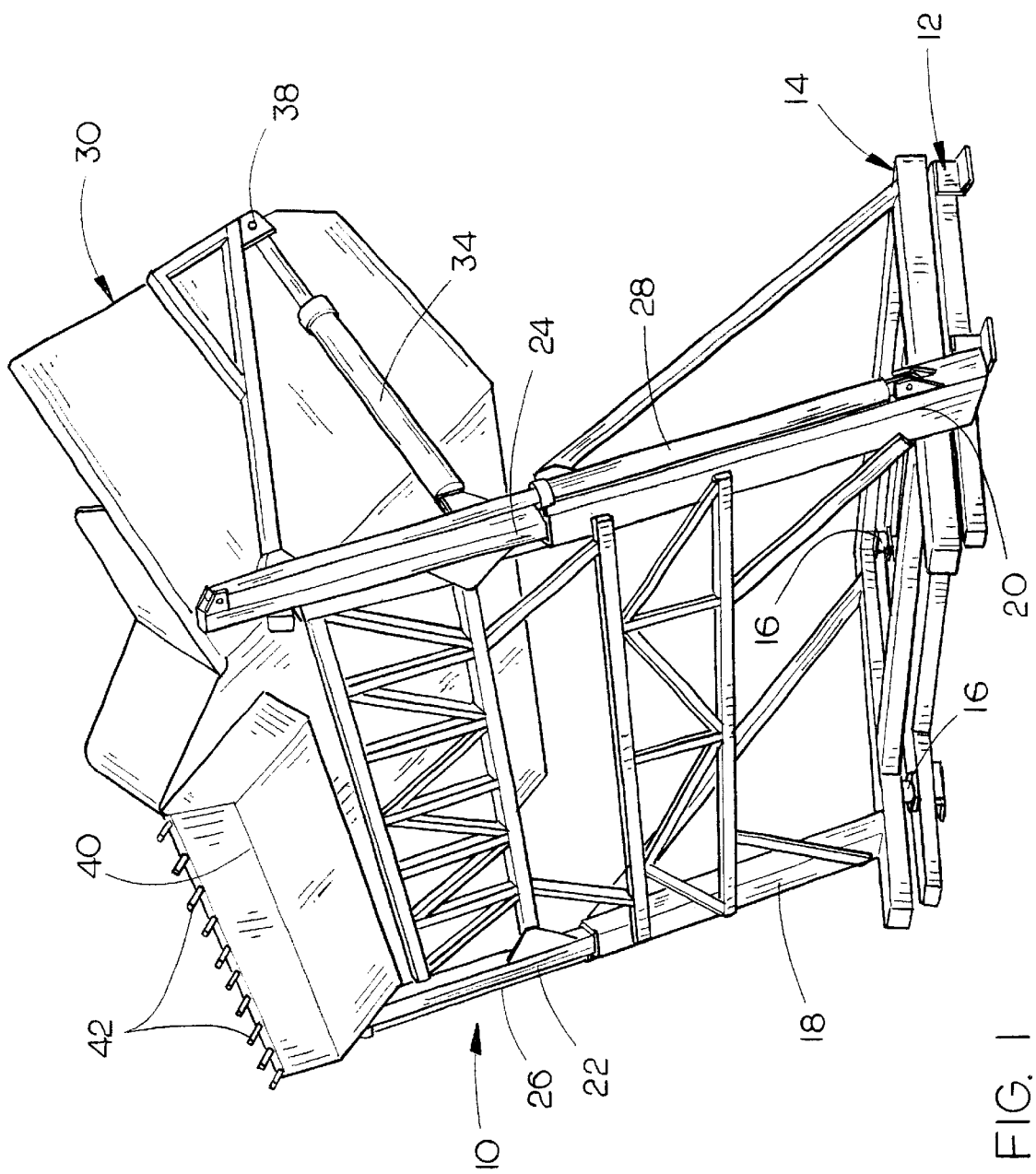
FIG. 1 is a front perspective view of the side dump box of this invention.

The side dump box apparatus of this invention is referred to generally by the reference numeral 10. Apparatus 10 generally resembles the structure of the dump vehicle disclosed in U.S. Pat. No. 5,299,1856. However, the dump vehicle disclosed in U.S. Pat. No. 5,299,856 is mounted on a wheeled carriage and does not have load cells associated therewith.

Side dump box apparatus 10 includes a substantially horizontally disposed support frame 12 which is preferably positioned on and secure to a substantially flat surface such as a concrete slab or the like. The numeral 14 refers to a support frame which is positioned above support frame 12, as seen in FIG. 1. A plurality of conventional load cells 16 are positioned between the support frames 12 and 14 for sensing the weight imposed on support frame 14.

A pair of slide supports 18 and 20 are secured to the support frame 14 and extend upwardly and outwardly therefrom, as illustrated in FIG. 1. Slides 22 and 24 are slidably received within slide supports 18 and 20, respectively. Slides 22 and 24 are moved with respect to slide supports 18 and 20 by hydraulic cylinders 26 and 28, respectively, so that the slides 22 and 24 may be moved between a lower position to an elevated position. Side dump box 30 is positioned at one side of the slides 22 and 24 and is pivotally connected thereto so that the side dump box 30 may be pivotally moved from the position illustrated by solid lines in FIG. 3 to the position illustrated by broken lines in FIG. 3. Hydraulic cylinders 32 and 34 have their base ends secured to slides 22 and 24, respectively, and have their rod ends pivotally secured to the side dump box 30 at 36 and 38, respectively, to move the side dump box between its non-dumping position and its dumping position and vice versa.

A liquid supplement tank 40 is mounted on the upper inner end of the side dump box 30 and has a plurality of spaced-apart discharge tubes or nozzles 42 extending therefrom which are in communication with the interior of the liquid supplement tank 40. The liquid supplement tank 40 is in communication with a source of liquid supplement under pressure so that the liquid supplement or supplements may be pumped into the tank 40 in the proper amount for subsequent discharge into the feed mixing truck as will be described hereinafter.

Figure 5:
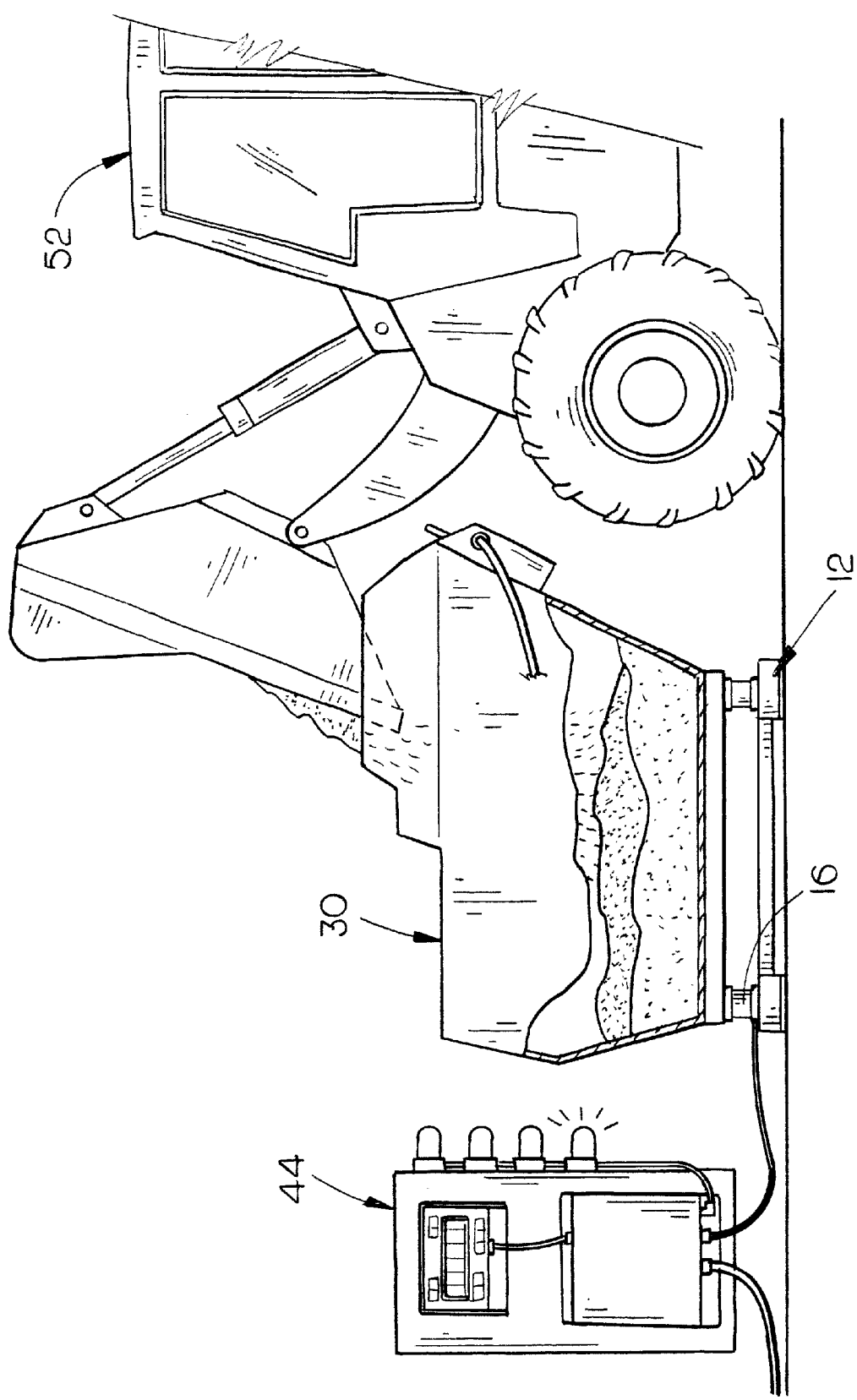
FIG. 5 is an end view illustrating ingredients being dumped into the side dump box.
Figure 6:
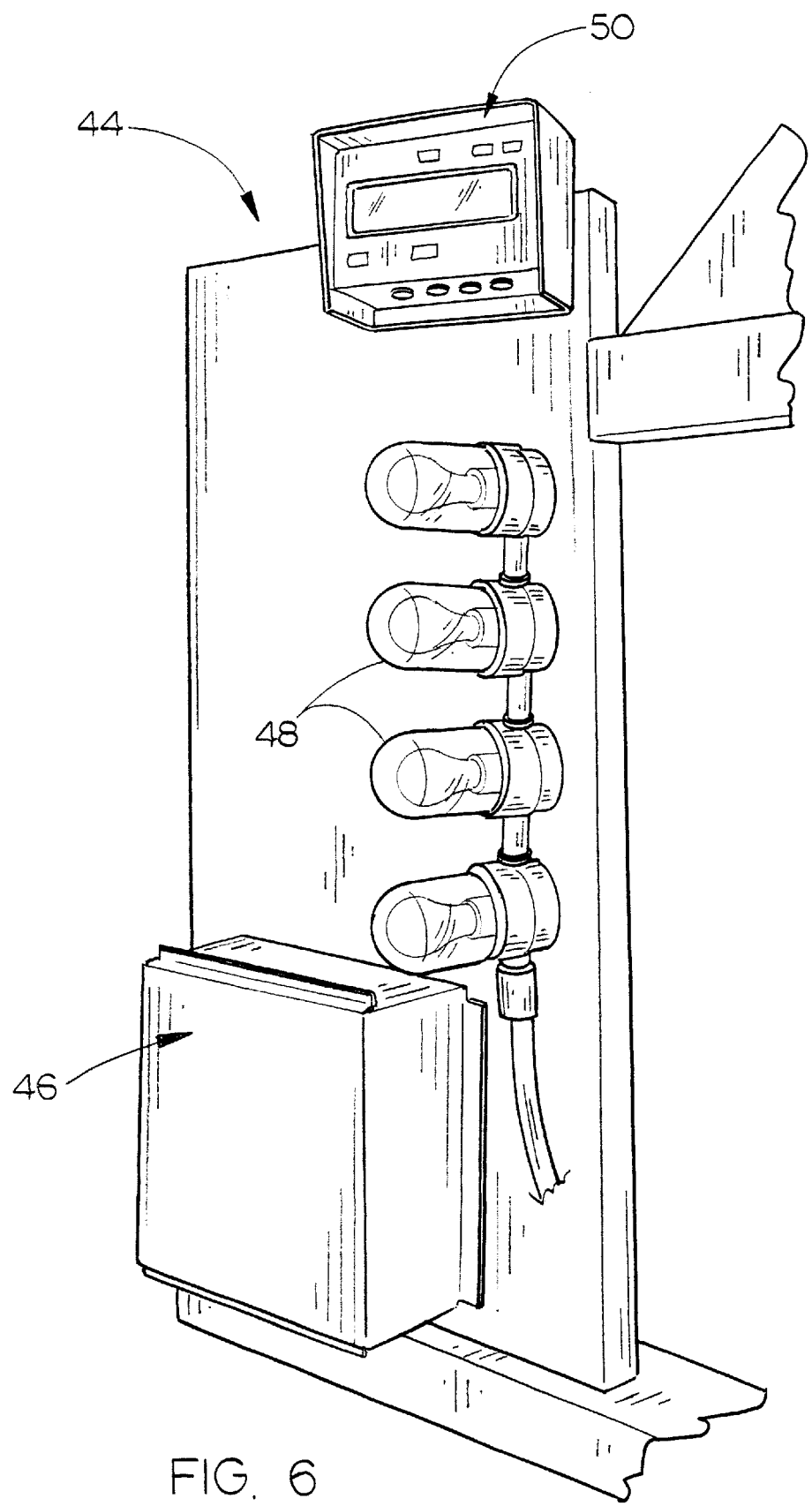
FIG. 6 is a perspective view of the control apparatus of the invention.

The numeral 44 refers generally to a control panel including a control box 46 having controls therein which control the operation of side dump box apparatus 10. A plurality of indicator lights 48 are also mounted on the control panel 44 and are operatively electrically connected to the control components within the control box 46. A weight readout or indicator 50 is provided on the control panel 44 and is electrically connected to the components within the control box 46. As seen in FIG. 5, the weigh cells 16 are electrically connected to the control box 46 so that the indicator or readout 50 will indicate the weight of the ingredients which have been placed in the side dump box 30. Control box 46 includes control components which may be remotely controlled by the operator of the front-end loader 52 and/or the operator of the feed mixing truck 54.

Figure 2:
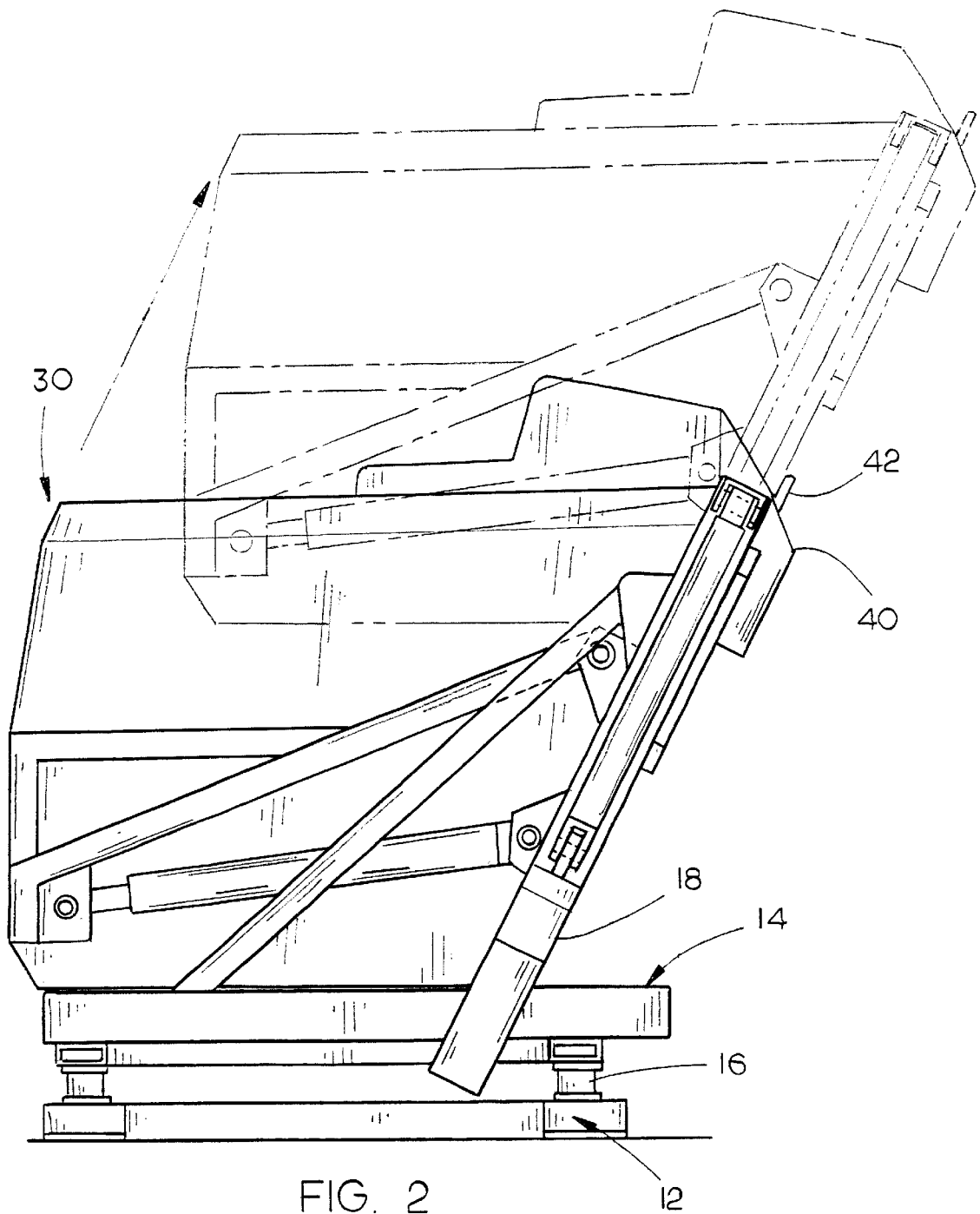
FIG. 2 is a side view of the side dump apparatus of this invention with the broken lines indicating the side dump box having been moved to an upper position.

The method of operating the apparatus 10 is as follows. Side dump box 30 would normally be in the position illustrated in FIGS. 2 and 5. The operator of the front-end loader 52 would then place a first ingredient into the interior of the side dump box 30 until the indicator readout 50 indicates that the proper amount, by weight, of the first ingredient has been placed into the interior of the side dump box 30. The operator of the front-end loader 52 then dumps a second ingredient into the side dump box 30 until the indicator readout 50 indicates that the proper amount of the second ingredient, by weight, has been placed in the interior of the side dump box 30. This process is repeated until all of the ingredients of the feed ration have been dumped into the interior of the side dump box 30.

Figure 3:
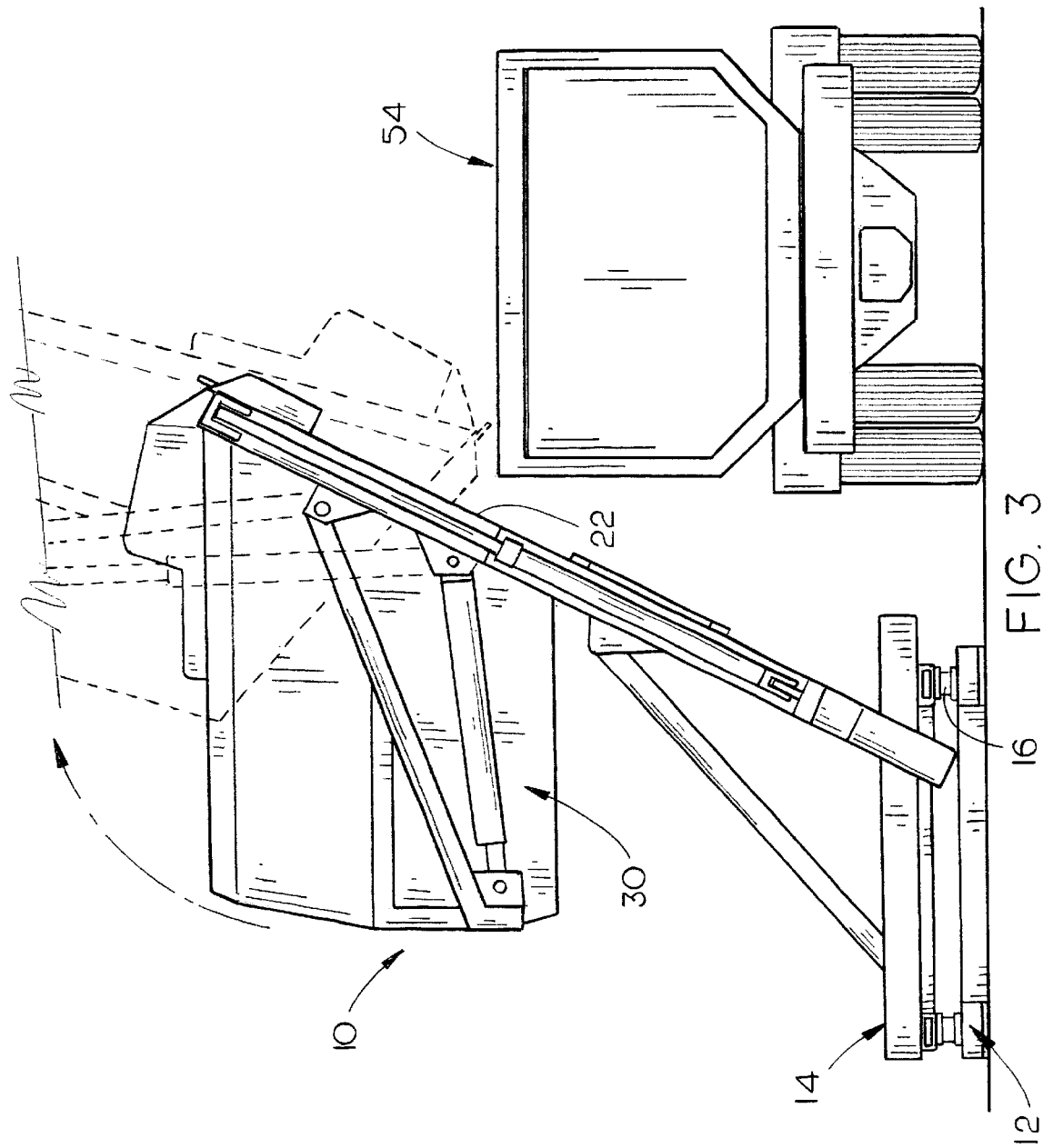
FIG. 3 is an end view of the apparatus of this invention with the broken lines indicating the manner in which the side dump box is dumped.
Figure 4:
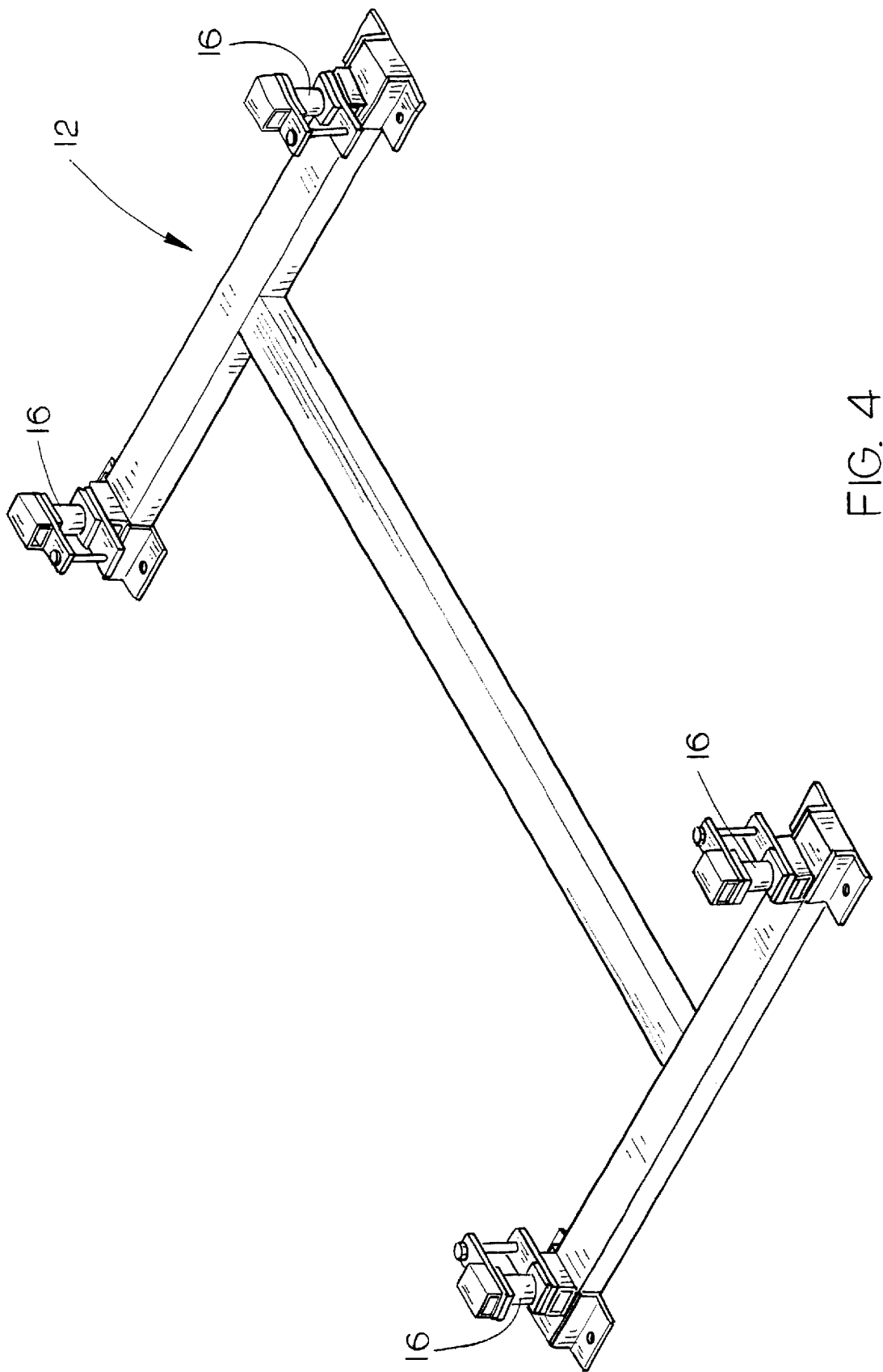
FIG. 4 is a perspective view of the support frame having load cells mounted thereon.

When a feed mixing truck 54 arrives in the pit area and have been driven adjacent the side dump box apparatus 10, as illustrated in FIG. 3, the operator of the feed mixing truck 54 remotely controls the hydraulic cylinders 26 and 28 to raise the side dump box 30 to the position illustrated by solid lines in FIG. 3. The operator of the feed mixing truck 54 could raise the side dump box 30 to the position illustrated by solid lines in FIG. 3 as the truck approaches the apparatus 10 if the same was so desired. At any rate, once the truck 54 and the side dump box 30 are in the position as illustrated in FIG. 3, the operator of the truck 54 remotely controls the operation of the hydraulic cylinders 32 and 34 to cause the side dump box to be moved from the position illustrated by solid lines in FIG. 3 to the dumping position illustrated in FIG. 3 so that the contents of the side dump box 30 are dumped into the interior of the truck box of the truck 54. If a liquid supplement has been previously pumped into the interior of tank 40, the dumping of the liquids therein would occur through the discharge tubes 42 when the side dump box 30 is moved to its dumping position.

Once the contents of the side dump box 30 have been dumped into the interior of the truck box of the truck 54, the operator of the truck 54 will remotely cause the cylinders 32 and 34 to retract to move the box 30 to the position illustrated by solid lines in FIG. 3. The operator will also remotely control the operation of the hydraulic cylinders 26 and 28 to lower the side dump box 30 to its lowermost position. The driver of the truck 54 then activates the feed mixing equipment on truck 54 to mix the ingredients of the ration as the truck is moved from the pit area to the feedlot area.

Although a single side dump box apparatus 10 is shown, a pair of the apparatuses 10 could be positioned side by side so that the contents of two side dump boxes 30 could be simultaneously dumped into the interior of a large feed mixing truck.

Thus it can be seen that a novel side dump box apparatus has been provided which enables the ingredients of a feed ration to be placed within the side dump box prior to the feed mixing truck arriving at the pit area. The contents of the side dump box may be dumped into the feed mixing truck in approximately one minute, thereby substantially reducing the amount of waiting time incurred by the feed mixing truck.

Thus it can be seen that the invention accomplishes at least all of its stated objectives.

I claim:
1. The method of batching out the ingredients of a feed ration, comprising the steps of:
   providing an elevating side dump box which is normally positioned near the ground in a non-dumping position on a stationary load cell structure and indicator which indicates the weight of ingredients placed therein, but which may be selectively raised to an elevated position above the box of a feed mixing truck and dumped;
   sequentially dumping individual ration ingredients into the dump box until the load cell structure and indicator indicates that the proper amount by weight of the individual ingredient has been placed in the dump box;
   holding the ingredients of the feed ration in the dump box until a feed mixing truck is in position adjacent the dump box;

elevating the dump box to its elevated position;

and dumping the dump box so that the ingredients are dumped into the feed mixing truck for mixing as the feed truck travels to a location remote from the dump box.

2. The method of claim 1 wherein the operation of said side dump box is remotely controlled.

3. The method of claim 1 wherein said side dump box includes means for dumping a predetermined amount of liquid additive into the feed mixing truck.

4. The method of claim 1 wherein a predetermined amount of liquid additive is delivered from the side dump box to the feed mixing truck.

5. An apparatus for batching out the ingredients of a feed ration and dumping the same into a feed mixing truck positioned adjacent thereto, comprising:

a first substantially horizontally disposed support frame wherein said frame is mounted to a surface;

a second support frame positioned above said first support frame;

a load cell means positioned between said first and second support frames for sensing the weight imposed thereon;

at least first and second upstanding slide supports;

at least first and second upstanding slides selectively movably mounted on each of said first and second slide supports, respectively, which are movable between a normal lower position and an elevated position;

a side dump box pivotally mounted on the upper ends of said slides and being selectively movable between a non-dumping position and a dumping position wherein the contents of the side dump box may be dumped into a feed mixing truck positioned therebelow when said slides are in the said elevated position.

6. The apparatus of claim 5 further including remote control means for elevating and dumping said side dump box.

7. The apparatus of claim 5 further including a liquid reservoir and discharge means on said side dump box for dumping liquid into the feed mixing truck.

8. The apparatus of claim 5 further including an indicator means operatively connected to said load cell means for indicating the weight of ingredients in said side dump box.

* * * * *